United States Patent
Haruyama et al.

(10) Patent No.: US 8,656,723 B2
(45) Date of Patent: Feb. 25, 2014

(54) OPERATION CONTROL METHOD FOR GAS TURBINE AND OPERATION CONTROLLER FOR GAS TURBINE

(75) Inventors: Hiroshi Haruyama, Hitachi (JP); Hideki Tamaki, Hitachi (JP); Yoshitaka Kojima, Hitachi (JP); Hironori Kamoshida, Tsuchiura (JP)

(73) Assignee: Hitachi, Ltd., Tokyo (JP)

( * ) Notice: Subject to any disclaimer, the term of this patent is extended or adjusted under 35 U.S.C. 154(b) by 128 days.

(21) Appl. No.: 13/382,162

(22) PCT Filed: Jul. 7, 2009

(86) PCT No.: PCT/JP2009/003142
§ 371 (c)(1),
(2), (4) Date: Jan. 4, 2012

(87) PCT Pub. No.: WO2011/004425
PCT Pub. Date: Jan. 13, 2011

(65) Prior Publication Data
US 2012/0102966 A1    May 3, 2012

(51) Int. Cl.
*F02C 1/00* (2006.01)
(52) U.S. Cl.
USPC ........................................ 60/772; 60/39.091
(58) Field of Classification Search
USPC ................. 60/39.281, 772, 39.091
See application file for complete search history.

(56) References Cited

U.S. PATENT DOCUMENTS 4,358,930 A * 11/1982 Pope et al. ............. 60/647

FOREIGN PATENT DOCUMENTS

| JP | 1-299621 | 12/1989 |
| JP | 10-169413 | 6/1998 |
| JP | 2001-329856 | 11/2001 |
| JP | 2002-297710 | 10/2002 |

* cited by examiner

*Primary Examiner* — Phutthiwat Wongwian
(74) *Attorney, Agent, or Firm* — Antonelli, Terry, Stout & Kraus, LLP.

(57) ABSTRACT

An operation control method for a gas turbine includes making a molten salt map of molten salt for causing high-temperature corrosion on high-temperature components of the turbine due to impurities using a thermodynamic equilibrium calculation on the basis of the impurities contained in low-quality fuel and operation data of the gas turbine, indicating a surface temperature and a pressure of the high-temperature components of the turbine on the molten salt map, predicting a lifetime of the high-temperature components of the gas turbine by estimating a corrosion rate thereof, and controlling the flow rate of the low-quality fuel supplied to a combustor so that an area of surface temperature and pressure regions of the high-temperature components superposing on the region of molten salt in the liquid phase on the molten salt map is reduced.

14 Claims, 3 Drawing Sheets

OPERATION CONTROL METHOD FOR GAS TURBINE AND OPERATION CONTROLLER FOR GAS TURBINE

TECHNICAL FIELD

The present invention relates to an operation control method for a gas turbine for burning low-quality fuel rich in impurities of Na, K, S, V, etc. and an operation controller for the gas turbine.

BACKGROUND ART

Fuel used for a gas turbine is broadly divided into oil fuel represented by light oil, kerosene, and heavy oil and gas fuel represented by natural gas and city gas, though in correspondence to the recent rise in fuel prices, there are possibilities of an increase in the demand of low-quality fuel of a lower price and further correspondence to various kinds of fuel is required.

For example, C heavy oil and heavy-duty oil which are low-quality fuel, compared with regular fuel, contain more impurities (Na, K, S) or (Na, K, S, V) in the fuel, so that on high-temperature members composing a gas turbine such as movable blades and static blades with which high-temperature combustion gas generated when low-quality fuel containing these impurities is burnt makes direct contact, due to an alkaline sulfate and a V compound caused by the aforementioned impurities, high-temperature corrosion is easily caused.

The alkaline sulfate and V compound are of the highest corrosiveness in a molten salt (liquid phase) state and moreover, high-temperature corrosion caused on the high-temperature members of the gas turbine due to the molten salt, compared with high-temperature oxidation by regular fuel, progresses at an extremely fast speed, so that it is a very important problem for the lifetime management of the high-temperature components such as the movable blades and static blades used for the gas turbine.

As a prior art for preventing high-temperature corrosion due to molten salt, although aiming at gasified fuel obtained by gasifying coal, as a prevention measure for high-temperature corrosion due to the impurities contained in the gasified fuel, in Japanese Patent Laid-open No. Hei 01 (1989)-299621, the prior art for preprocessing gasified fuel to desulfurize or dealkalize it, removing impurities in the gasified fuel, and then supplying it to the turbine is disclosed.

Further, in Japanese Patent Laid-open No. 2002-297710, the prior art for predicting deterioration of the high-temperature members composing the gas turbine by high-temperature combustion gas and supporting the maintenance plan of a power generation plant is disclosed.

DOCUMENT OF PRIOR ART

Patent Document

Patent Document 1: Japanese Patent Laid-open No. Hei 01 (1989)-299621
Patent Document 2: Japanese Patent Laid-open No. 2002-297710

SUMMARY OF THE INVENTION

Problems to be Solved by the Invention

On the other hand, removal of oil-soluble V contained in fuel is technically possible by a combination of the ion exchange resin method, the organic solvent extraction method, and the hydrogenation method, though a device with these techniques combined is very complicated in structure, and the manufacturing cost is high, thus the practical realization is economically difficult. Therefore, when using fuel containing V for the gas turbine, a corrosion prevention method for the high-temperature members of the gas turbine for using a compound of Mg, Ca, Si, etc. as a corrosion prevention fuel additive and increasing the melting point of the V compound in combustion gas with burnt fuel is widely used.

However, if the aforementioned corrosion prevention additives are used, at the time of combustion of the fuel, the elements contained in the combustion gas and these additives react with each other, thus a large quantity of ash (combustion residual) such as $MgSO_4$ is generated.

The ash adheres to the movable blades and static blades which are high-temperature members of the gas turbine, thus the path of combustion gas flowing down through the gas turbine narrows and it becomes highly possible that a reduction in the output of the gas turbine and blocking of the cooling holes of the movable blades and static blades are caused.

On the other hand, instead of a measure on the fuel side, as one of the methods for improving the corrosion resistance of the high-temperature members of the gas turbine, there is a method using a material rich in Cr and Al of high corrosion resistance for the high-temperature members of the gas turbine. However, in the present state that combustion gas is made high in temperature for realization of higher efficiency of the gas turbine, for the high-temperature members, not only the corrosion resistance but also the strength in high temperatures is necessary and Cr and Al of high corrosion resistance reduce the strength in high temperatures, so that the content is apt to reduce.

Further, as another one of the methods for improving the corrosion resistance of the high-temperature members of the gas turbine, a method for applying, on the movable blades and static blades which are high-temperature members of the gas turbine, an alloy coating of MCrAlY (M is either of Ni and Co or both of them) of higher corrosion resistance than the base material of the movable blades and static blades or applying a heat insulation ceramic coating on the MCrAlY coating by spray coating is performed.

However, the coating is applied mainly to improve the heat resistance, thus the corrosion resistance due to molten salt is inferior, so that even if such a coating is applied, it is difficult to prevent high-temperature corrosion due to molten salt caused by impurities contained in the low-quality fuel for the high-temperature members of the gas turbine.

Therefore, to perform the lifetime management of the high-temperature components used for the gas turbine, it is important to find the state of high-temperature corrosion due to molten salt of an alkaline sulfate and a V compound that occurs to the high-temperature members of the gas turbine.

An object of the present invention is to provide an operation control method for a gas turbine, to manage the lifetime of high-temperature components used for the gas turbine, for precisely estimating the corrosion rate of high-temperature corrosion due to molten salt generated in the high-temperature components of the gas turbine caused by impurities of Na, K, and S or Na, K, S, and V contained in low-quality fuel burnt in the gas turbine and suppressing progress of the high-temperature corrosion and an operation controller for the gas turbine.

Means for Solving the Problems

An operation control method for the gas turbine for burning low-quality fuel containing high-temperature corrosive impurities of the present invention, comprising the steps of: making a molten salt map in a liquid phase state, on the basis of impurities contained in the low-quality fuel and operation data of the gas turbine, by calculating a dew point and a solidus temperature of molten salt for causing high-temperature corrosion on high-temperature components of the turbine through which high-temperature combustion gas flows down due to the impurities using a thermodynamic equilibrium calculation, calculating and indicating a surface temperature and a pressure of the high-temperature components of the turbine on the molten salt map to determine a superposition state of the surface temperature and the pressure on a region of molten salt in a liquid phase, predicting a lifetime of the high-temperature components of the gas turbine by estimating a corrosion rate of the high-temperature components, and controlling a flow rate of the low-quality fuel supplied to a combustor on the basis of the prediction of the lifetime of the high-temperature components so that an area of surface temperature and pressure regions of the high-temperature components of the gas turbine superposing on the region of molten salt in the liquid phase on the molten salt map is reduced.

An operation controller for the gas turbine for burning low-quality fuel containing high-temperature corrosive impurities of the present invention, comprising: a calculator for molten salt map preparation for making a molten salt map in a liquid phase state, on the basis of impurities contained in the low-quality fuel and operation data, by calculating a dew point and a solidus temperature of molten salt for causing high-temperature corrosion on high-temperature components of the turbine through which high-temperature combustion gas flows down due to the impurities using a thermodynamic equilibrium calculation, a calculator for corrosion region determination for calculating and indicating a surface temperature and a pressure of the high-temperature components of the turbine on the molten salt map made by the calculator for molten salt map preparation to determine a superposition state of the surface temperature and the pressure on a region of molten salt in a liquid phase, a calculator for corrosion damage prediction for predicting a lifetime of the high-temperature components of the gas turbine by estimating a corrosion rate of the high-temperature components, and a calculator for operational condition optimization for controlling a flow rate of the low-quality fuel supplied to a combustor on the basis of the prediction of the lifetime of the high-temperature components so that an area of surface temperature and pressure regions of the high-temperature components of the gas turbine superposing on the region of molten salt in the liquid phase on the molten salt map is reduced.

Advantages of the Invention

According to the present invention, an operation control method for a gas turbine, to manage the lifetime of high-temperature components used for the gas turbine, for precisely estimating the corrosion rate of high-temperature corrosion caused on the high-temperature components of the gas turbine due to impurities of Na, K, and S or Na, K, S, and V contained in low-quality fuel burnt in the gas turbine and suppressing progress of the high-temperature corrosion and an operation controller for the gas turbine can be realized.

DETAILED DESCRIPTION OF THE PREFERRED EMBODIMENTS

Next, the operation control method for a gas turbine and the operation controller for the gas turbine that are an embodiment of the present invention will be explained with reference to the accompanying drawings.

Embodiment 1

Figure 1:
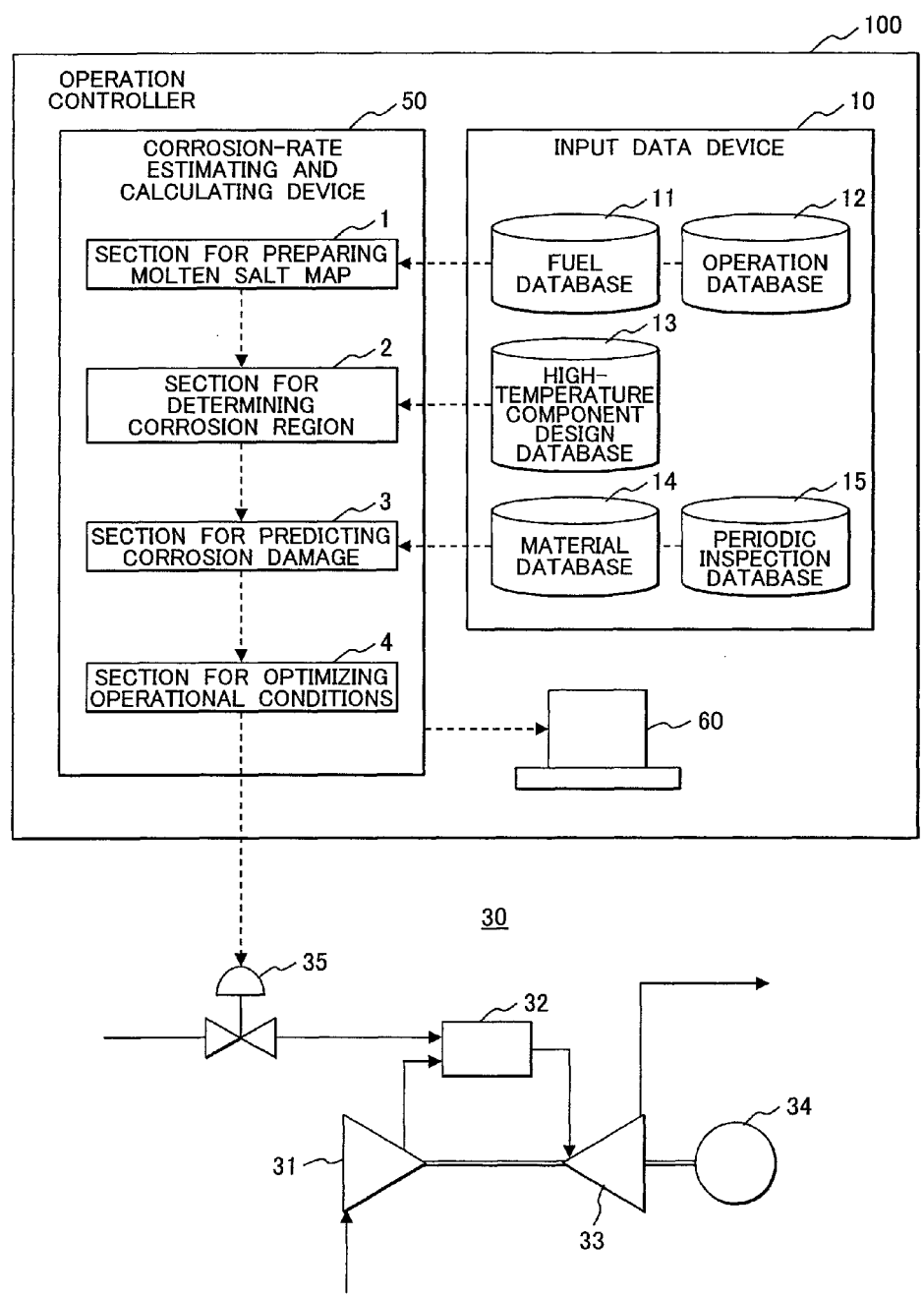
FIG. 1 is a control block diagram showing the schematic constitution of the operation controller of the gas turbine that is an embodiment of the present invention.

FIG. 1 is a schematic diagram showing the operation control method for the gas turbine and the constitution of the operation controller for the gas turbine which are an embodiment of the present invention when using C heavy oil or heavy-duty oil which are, for example, low-quality fuel containing impurities of Na, K, and S or impurities of Na, K, S, and V as fuel of the gas turbine device.

In FIG. 1, an operation controller 100 for realizing the operation control method for the gas turbine and the operation controller for the gas turbine of this embodiment performs the operation of a gas turbine device 30 by a corrosion-rate estimating and calculating device 50 and an input data device 10 that compose the operation controller 100.

And, the gas turbine device 30 to be operated which is controlled by the operation controller 100, as shown in the lower part of FIG. 1, includes a compressor 31 for compressing air used as combustion air, a combustor 32 for mixing and burning low-quality fuel rich in impurities of Na, K, and S or impurities of Na, K, S, and V which are supplied externally via a fuel supply system and air compressed by the compressor 31 to generate high-temperature combustion gas, a turbine 33 driven by the high-temperature combustion gas burnt and generated by the combustor 32, a generator 34 for rotating and generating power by being driven by the turbine 33, and a fuel regulating valve 35 installed in the fuel supply system for regulating the flow rate of the low-quality fuel which is operated on the basis of a command signal calculated by the corrosion-rate estimating and calculating device 50 and is supplied to the combustor 32.

The corrosion-rate estimating and calculating device 50 installed in the operation controller 100 for controlling the operation of the gas turbine device 30 is composed of the calculators of a section for making molten salt map 1, a section for determining corrosion region 2, a section for predicting corrosion damage 3, and a section for optimizing operational conditions 4.

The calculator of the section for making molten salt map 1 composing the corrosion-rate estimating and calculating device 50, by use of fuel data and operation data which are stored respectively in a fuel database 11 and an operation database 12 installed in the input data device 10, on the basis of impurities (Na, K, S, etc.) or (Na, K, S, V, etc.) contained in C heavy oil or heavy-duty oil of low-quality fuel supplied to the combustor 32 of the gas turbine device 30, prepares a map of molten salt (liquid phase) of an alkaline sulfate and molten salt (liquid phase) of a V compound for causing high-temperature corrosion on the high-temperature components (movable blades 22 and static blades 21) composing the turbine 33 through which high-temperature combustion gas flows down due to the aforementioned impurities by a thermodynamic equilibrium calculation.

The calculator of the section for determining corrosion region 2 composing the corrosion-rate estimating and calculating device 50, by use of the molten salt map made by the section for making molten salt map 1 and design data of the high-temperature components stored in a high-temperature component design database 13 installed in the input data device 10, determines the state of superposition of the surface temperature and pressure of the movable blades 22 and static blades 21 of the high-temperature components on the region of molten salt (liquid phase) on the molten salt state map made by the section for making molten salt map 1.

The calculator of the section for predicting corrosion damage 3 composing the corrosion-rate estimating and calculating device 50, by use of the generation quantity of molten salt per each unit time and unit cross-sectional area which is calculated by the section for making molten salt map 1 and the material data and periodic inspection data which are stored respectively in a material database 14 and a periodic inspection database 15 which are installed in the input data device 10, predicts the lifetime of the high-temperature components of the gas turbine 33.

The calculator of the section for optimizing operational conditions 4 composing the corrosion-rate estimating and calculating device 50, on the basis of the lifetime prediction of the high-temperature components of the gas turbine 33 calculated by the section for predicting corrosion damage 3, so that the area of the surface temperature and pressure regions of the high-temperature components superposing on the region of molten salt on the molten salt map is reduced, calculates the combustion temperature of the low-quality fuel to be burnt by the combustor 32 of the gas turbine device 30.

Figure 5:
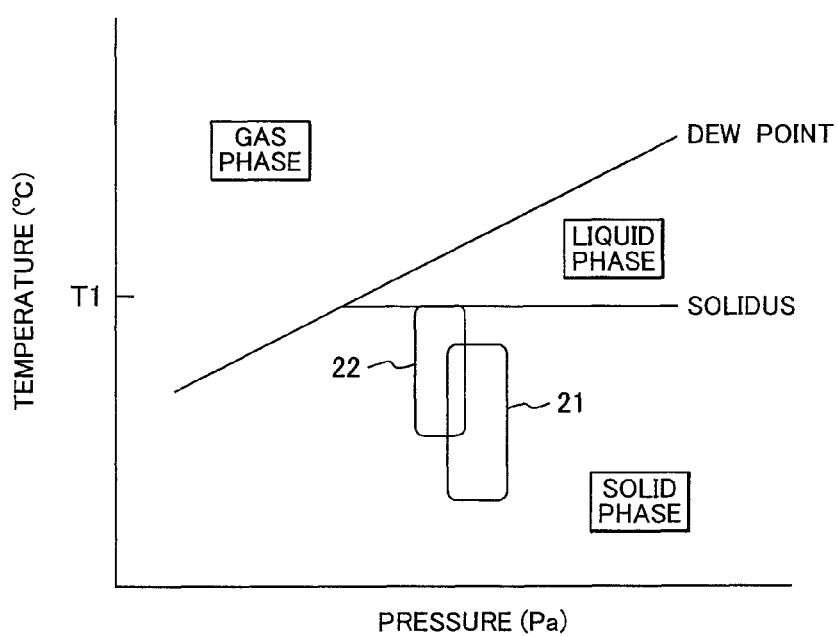
FIG. 5 is a schematic diagram showing the surface temperature and pressure distributions of the high-temperature components of the turbine regulated by the section for optimizing operational conditions which are superposed on the molten salt map using $Na_2SO_4$ and $K_2SO_4$ as molten salt which is made by the section for making molten salt map possessed by the operation controller for the gas turbine of the embodiment shown in FIG. 1.

And, the calculator of the section for optimizing operational conditions 4, on the basis of a command signal outputted by the calculation of the section for optimizing operational conditions 4, regulates the opening angle of the fuel regulating valve 35 installed in the fuel system supplied to the combustor 32 of the gas turbine device 30, controls the flow rate of low-quality fuel supplied to the combustor 32 so as to reduce, in the combustor 32, the temperature of combustion gas flowing down to the movable blades 22 and static blades 21 of the high-temperature components of the gas turbine 33 to a desired temperature, thereby avoids a situation that the movable blades 22 and static blades 21, as shown in FIG. 5, partially superpose on the region of molten salt.

In the corrosion-rate estimating and calculating device 50 of the operation controller 100, the input data device 10 for inputting various kinds of data necessary to calculate a command signal for operating the gas turbine device 30 by the corrosion-rate estimating and calculating device 50 is installed.

The input data device 10 includes the fuel data 11 of C heavy oil and heavy-duty oil of low-quality fuel containing impurities of Na, K, S, etc. or impurities of Na, K, S, V, etc. which are supplied to the gas turbine device 30, the operation data 12 of the gas turbine device 30, the design data 13 of the movable blades and static blades which are high-temperature components composing the turbine 33 of the gas turbine device 30, the material data 14 composing the movable blades 22 and the static blades 21 of the high-temperature components composing the turbine 33, and the periodic inspection data 15 of the gas turbine device 30.

And, an operation control method for a gas turbine, for the gas turbine device 30 for burning low-quality fuel containing high-temperature corrosive impurities of Na, K, S, etc. or high-temperature corrosive impurities of Na, K, S, V, etc., by use of the impurity concentration in combustion gas generated in the combustor 32 by the operation controller 100, the operation data of the gas turbine device 30, the design data of the high-temperature components of the gas turbine 33, and the material data of the high-temperature components, for identifying the state of molten salt generated in the high-temperature members of the gas turbine 33 caused by impurities in combustion gas when the gas turbine device 33 is in operation, thereby estimating the corrosion rate of the high-temperature members, and controlling the operation of the gas turbine on the basis of the estimation results of the corrosion rate of the high-temperature members, and an operation controller for the gas turbine are provided.

The operation control method for the gas turbine and the operation controller for the gas turbine that is an embodiment of the present invention will be explained below in detail by referring to FIG. 1. The corrosion-rate estimating and calculating device 50 composing the operation controller 100 of this embodiment, as aforementioned, includes the calculators of the section for making molten salt map 1, the section for determining corrosion region 2, the section for predicting corrosion damage 3, and the section for optimizing operational conditions 4 and furthermore is constructed by a display 60, an input device such as a mouse and a keyboard which are not drawn, the corrosion-rate estimating and calculating device 50, and a personal computer or a work station including the input data device 10 which will be described later.

The calculators of the section for making molten salt map 1, the section for determining corrosion region 2, the section for predicting corrosion damage 3, and the section for optimizing operational conditions 4 which are installed in the corrosion-rate estimating and calculating device 50 designate automatically or manually the input data necessary for calculation using the input data device 10, thereby fetch and calculate necessary data from among the data stored respectively in the fuel database 11, the operation database 12, the high-temperature component design database 13, the material database 14, and the periodic inspection data 15 which are installed in the input data device 10, and can display the calculation results on the display 60.

Figure 2:
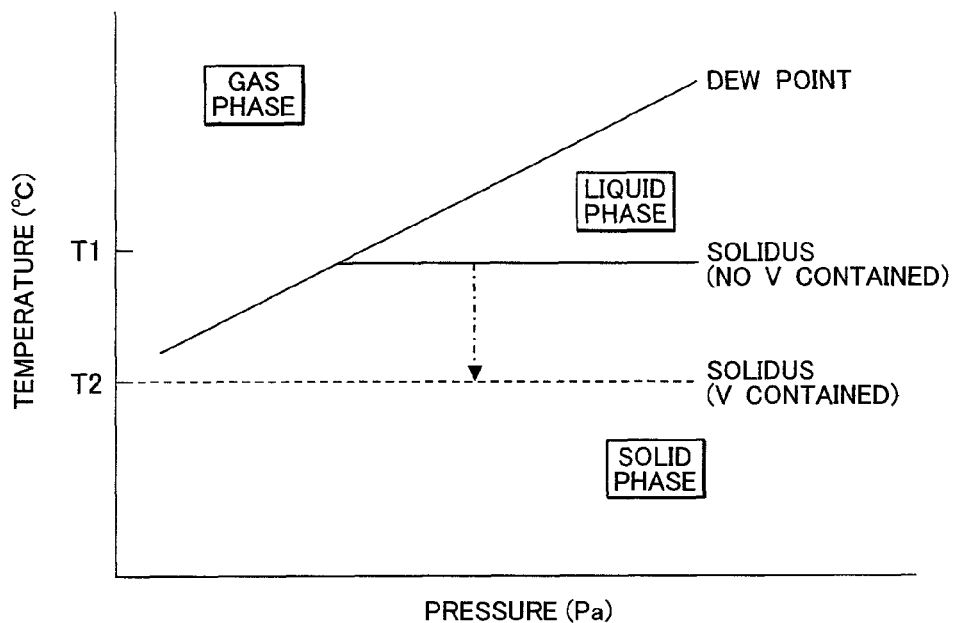
FIG. 2 is a schematic diagram showing the dew point and solidus of molten salt made by the section for making the molten salt map possessed by the operation controller for the gas turbine of the embodiment shown in FIG. 1.

The calculator of the section for making molten salt map 1 installed in the corrosion-rate estimating and calculating device 50, by use of the fuel data and operation data which are stored respectively in the fuel database 11 and the operation database 12 which are installed in the input data device 10, on the basis of the impurities (Na, K, S, etc.) contained in the low-quality fuel supplied to the combustor 32 of the gas turbine device 30, calculates the dew point and solidus temperature of molten salt of an alkaline sulfate for causing high-temperature corrosion on the high-temperature components (movable blades 22 and static blades 21) composing the turbine 33 through which high-temperature combustion gas flows down due to the aforementioned impurities by using the thermodynamic equilibrium calculation, and prepares a molten salt map in a molten salt (liquid phase) state shown in FIG. 2.

The molten salt corrosion is caused when the alkaline sulfate is in a liquid phase and when the pressure is fixed, the temperature range of existence of the liquid phase is the temperature range divided between the dew point and the solidus of the alkaline sulfate schematically shown in FIG. 2.

This temperature can be calculated by the thermodynamic equilibrium calculation using the impurity quantity in combustion gas. Further, the impurity quantity in combustion gas is calculated using the impurity quantity contained in fuel.

Here, the dew-point temperature of the alkaline sulfate depends on the saturated vapor pressure of the alkaline sulfate, so that it can be expressed by a function of the partial pressure of the alkaline sulfate. The partial pressure of the alkaline sulfate depends on the total pressure and the alkaline sulfate quantity of the system. Therefore, the dew-point temperature, when the total pressure is fixed, can be expressed as an alkaline sulfate quantity and when the alkaline sulfate quantity is fixed, can be expressed as a function of the total pressure.

On the other hand, the solidus temperature is independent of the gas phase of the alkaline sulfate, so that the dependence on pressure may be considered to be low.

FIG. 2 is a diagram schematically showing the dew point and solidus of molten salt (hereinafter, called a molten salt map) and the region shown by the liquid phase indicates the existence region of the molten salt. The dew point and solidus move depending on the impurity quantity contained in combustion gas and for example, Na, K, S, etc. are added to low-quality fuel as impurities and when a V compound is contained, as shown as a dotted line in FIG. 2, the solidus is changed to a solidus corresponding to the temperature T2 lower than the temperature T1, so that the molten salt region in the liquid phase of the V compound increases.

Further, as described later, the surface temperature and pressure of the high-temperature members of the gas turbine 33 are superposed and shown on the molten salt map in FIG. 2, thereby can be indicated by a region for each high-temperature member. Therefore, the overlaid portion of the surface temperature and pressure regions of the high-temperature members of the gas turbine 33 and the molten salt region in the liquid phase is found to be a molten salt corrosion occurrence region.

On the other hand, the fuel data stored in the fuel database 11 is data containing the composition of low-quality fuel and since the fuel database 11 is a database containing the quantity of all the elements introduced to the combustor 32 of the gas turbine device 30 per each unit time and unit cross-sectional area, the impurity quantity is naturally contained in it.

The operation data stored in the operation database 12 is data of a database containing the air flow rate and fuel flow rate supplied to the gas turbine device which are different from each for each gas turbine device 30 to be operated and from the numerical values of these operation data, the quantities of O, N, C, H, etc. contained in combustion gas per each unit time and unit cross-sectional area are calculated.

Corrosive impurities in combustion gas which are generated by burning air and low-quality fuel in the combustor 32 of the gas turbine device 30 are derived from the low-quality fuel introduced into the combustor 32 of the gas turbine device 30 and air pulled in the compressor 31, so that to perform the thermodynamic equilibrium calculation of molten salt, for all the elements contained in them, the quantity per each unit time and unit cross-sectional area must be calculated.

Therefore, the calculator of the section for making molten salt map 1, on the basis of the fuel data pre-analyzed regarding the low-quality fuel stored in the fuel database 11, calculates the impurity quantities of Na, K, S, V, etc. per each unit time and unit cross-sectional area, inputs all the quantities other than the aforementioned impurity quantities and the impurities of O, N, C, H, etc. which are extracted from the operation data stored in the operation database 12, thereby performs the thermodynamic equilibrium calculation in consideration of the air flow rate and fuel flow rate which are supplied to the combustor 32 of the gas turbine device 30.

The calculator of the section for making molten salt map 1 installed in the corrosion-rate estimating and calculating device 50 composing the operation controller 100 of this embodiment uses the thermodynamic equilibrium calculation software FactSage of GTT Technologies, Ltd. including a substantial thermodynamic database concerning molten salt such as a slag.

The thermodynamic equilibrium calculation performs a hypercomplex system equilibrium state calculation using the Gibbs free energy minimization method. And, according to the thermodynamic equilibrium calculation, the kind and generation quantity of molten salt generated at an optional temperature and pressure due to impurities of Na, K, S, etc. or impurities of Na, K, S, V, etc. and the dew point of molten salt and solidus temperature can be obtained.

The generation quantity of molten salt is obtained from the fuel data and operation data per each unit time and unit cross-sectional area which are stored in the fuel database 11 and the operation database 12 by the section for making molten salt map 1, so that the unit is expressed by $g/mm^2/s$ or others.

The calculator of the section for making molten salt map 1, by use of these calculation results, plots the generation quantities by putting the logarithmically expressed pressure (Pa) on the axis of abscissas and the temperature (° C.) on the axis of ordinates and prepares a molten salt map as shown in FIG. 2.

The dew point and solidus on the molten salt map shown in FIG. 2 vary with the composition of low-quality fuel, though continuous analysis of the fuel composition is not realistic, so that it is preferable to periodically sample low-quality fuel and analyze the fuel composition.

Figure 3:
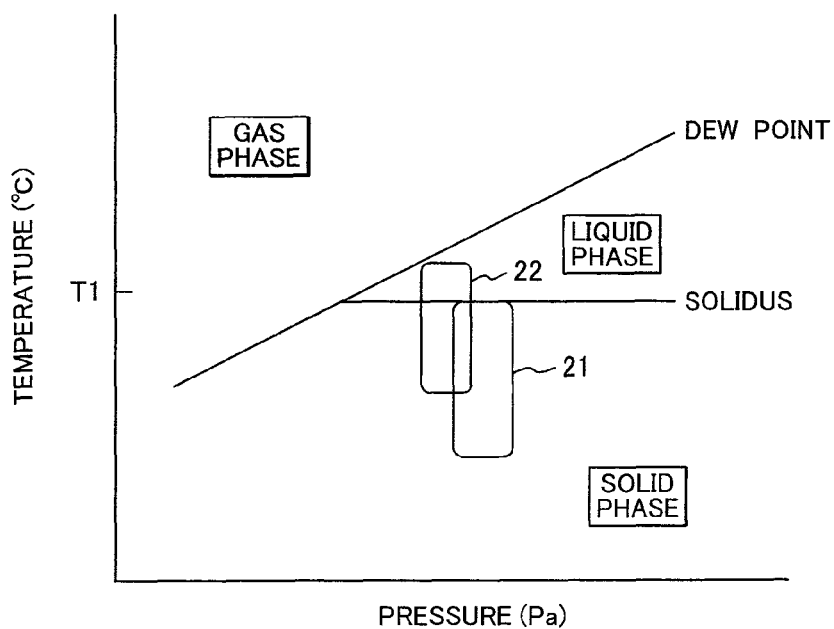
FIG. 3 is a schematic diagram showing the surface temperature and pressure distributions of the high-temperature components of the turbine prepared by the section for determining the corrosion region which are superposed on the molten salt map using $Na_2SO_4$ and $K_2SO_4$ as molten salt which is made by the section for making molten salt map possessed by the operation controller for the gas turbine of the embodiment shown in FIG. 1.

Next, the calculator of the section for determining corrosion region 2, on the molten salt map made by the section for making molten salt map 1, as shown in FIG. 3, by use of the high-temperature component design data of the turbine 33 which is stored in the high-temperature component design database 13 installed in the input data device 10, calculates, superposes, and displays the surface temperature and pressure of the movable blades 22 and the static blades 21 of the high-temperature components, and determines the superposition state of whether the surface temperature and pressure of the movable blades 22 and the static blades 21 of the high-temperature components of the gas turbine 33 superpose on the region of molten salt (liquid phase) higher in temperature than the solidus on the molten salt map made by the section for making molten salt map 1 or not.

The high-temperature component design database 13 of the gas turbine 33 is a high-temperature component design database of the gas turbine 33 for storing data containing the designed surface temperature and pressure distribution of the high-temperature components.

When the impurities contained in low-quality fuel of C heavy oil or heavy-duty oil are Na, K, and S, the generated molten salt is mainly molten salt of $Na_2SO_4$ and $K_2SO_4$.

FIG. 3 shows, on the molten salt map using $Na_2SO_4$ and $K_2SO_4$ as molten salt which is made by the section for making molten salt map 1, the surface temperature and pressure distributions of the first stage static blades 21 and first stage movable blades 22 of the high-temperature components of the gas turbine 33 prepared by the calculation of the calculator of the section for determining corrosion region 2 which are superposed.

FIG. 3 shows the state that the solidus which is a boundary line between the liquid phase and the solid phase corresponds to the temperature T1 and the temperature T1 corresponding to the solidus is within the range from about 800° C. to 900° C.

In the molten salt map using $Na_2SO_4$ and $K_2SO_4$ as molten salt and the surface temperature and pressure distribution of the high-temperature components of the gas turbine which are shown in FIG. 3, the first stage static blades 21 of the high-temperature component of the gas turbine 33 is not positioned at the surface temperature and pressure equivalent to the liquid phase portion which is a molten salt region, though a part of the first stage movable blades 22 of the high-temperature component of the gas turbine 33 is positioned in the liquid phase portion higher in temperature than the temperature T1 of the solidus, so that the drawing shows that it is very highly possible that molten salt corrosion may be caused on the portion.

For the surface temperature and pressure of the high-temperature components of the gas turbine 33, since in a high-temperature rotator such as the movable blades 22, the measurement is impossible when the real machine is in operation, the design data is used, though if data when the real machine is in operation can be measured as in a stationary body such as the first stage static blades 21, it is more preferable to use the operation data.

In the molten salt map using $Na_2SO_4$ and $K_2SO_4$ as molten salt and the surface temperature and pressure distribution of the high-temperature components of the gas turbine which are shown in FIG. 3, the examples of the first stage static blades 21 and the first stage movable blades 22 are shown as a high-temperature component of the gas turbine 33, though it goes without saying that for other high-temperature components of the gas turbine 33 such as the second stage and third stage movable blades and static blades, the determination is similarly possible.

Next, the calculator of the section for predicting corrosion damage 3, using the molten salt generation quantity per each unit time and unit cross-sectional area which is calculated by the section for making molten salt map 1 and the material data and periodic inspection data which are stored in the material database 14 and the periodic inspection database 15 which are installed in the input data device 10, predicts the lifetime by estimating the corrosion rate of the movable blades 22 and static blades 21 which are high-temperature components of the gas turbine 33.

Figure 4:
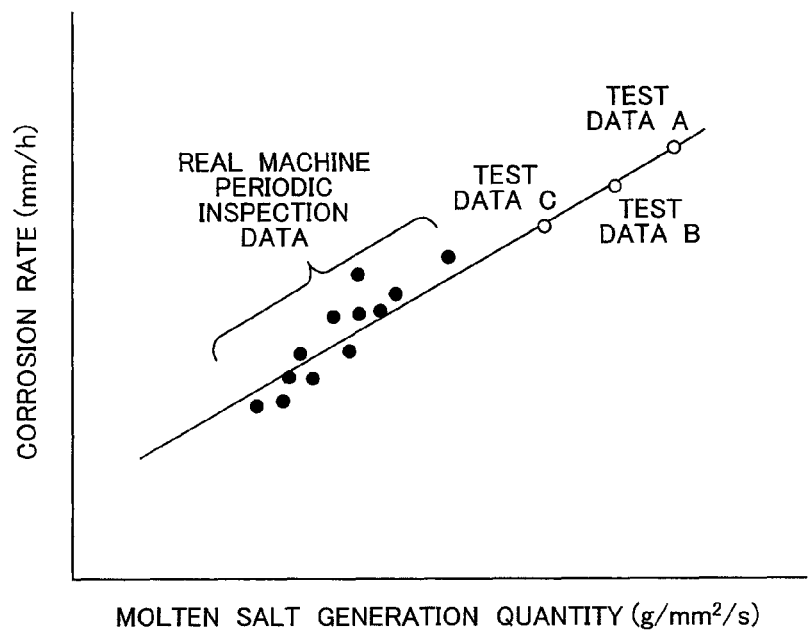
FIG. 4 is a schematic diagram showing the master curve of the corrosion rate prepared by the section for predicting corrosion damage possessed by the operation controller for the gas turbine of the embodiment shown in FIG. 1.

With respect to the lifetime prediction by the section for predicting corrosion damage 3, when the movable blades 22 and static blades 21 which are high-temperature components of the gas turbine 33 to be predicted exist in a molten salt corrosion region that is seriously damaged, since the lifetime of the movable blades 22 and static blades 21 of the high-temperature components becomes the lifetime of the gas turbine 33, the section for predicting corrosion damage 3 uses the corrosion rate of the high-temperature components of the gas turbine 33 due to molten salt shown in FIG. 4 which will be described later, thereby estimates the corrosion rate thereof by calculation, and predicts the lifetime.

The material database 14 installed in the input data device 10 is a database containing test data concerning the corrosion rate of the material used for the movable blades 22 and static blades 21 of the high-temperature components of the gas turbine 33 and contains molten salt corrosion rate data for each material of the movable blades 22 and static blades 21 of the high-temperature components and when the material is alloy-coated or ceramic-coated, for each coating.

The test data can be obtained from the burner rig test with the real machine imitated. The burner rig test, by use of fuel with fuel of the real machine imitated by addition of impurities, obtains the corrosion rate due to molten salt of the material or coating.

Further, the data of the molten salt generation quantity per each unit time and unit cross-sectional area obtained similarly to the real machine by the thermodynamic equilibrium calculation from the fuel, impurities, sucking air, and fuel flow rate that are used by the burner rig test is contained.

The periodic inspection database 15 installed in the input data device 10 is a database containing corrosion weight loss data measured in the periodic inspection of the gas turbine 30 of the real machine and also includes data concerning the corrosion rate which can be calculated from the corrosion data. The corrosion rate indicates a corrosion quantity per unit time and the unit is expressed by mm/h.

The corrosion rate due to molten salt is apt to depend on the molten salt generation quantity, so that if by the calculator of the section for predicting corrosion damage 3, the corrosion rate is plotted as a logarithm of the molten salt generation quantity on the axis of abscissas and a logarithm of the corrosion rate on the axis of ordinates, as shown in FIG. 4, a master curve of the corrosion rate is obtained for each material or coating.

The calculator of the section for predicting corrosion damage 3, furthermore, by plotting the corrosion rate data stored in the periodic inspection database 15 installed in the input data device 10 and the molten salt generation quantity calculated by the section for making molten salt map 1, from the molten salt generation quantity generated in the movable blades 22 and static blades 21 of the high-temperature components of the gas turbine 33 of the real machine, can estimate the corrosion rate with the real machine data reflected, so that from the corrosion rate estimated for the high-temperature components of the gas turbine 33 by the calculator of the section for predicting corrosion damage 3, the lifetime of the high-temperature components of the gas turbine 33 can be predicted.

Next, the calculator of the section for optimizing operational conditions 4, on the basis of the prediction results of the lifetime of the high-temperature components of the gas turbine 33 predicted from the corrosion rate estimated for the high-temperature components of the gas turbine 33 calculated by the calculator of the section for predicting corrosion damage 3, so that the area of the surface temperature and pressure regions of the movable blades 22 and static blades 21 of the high-temperature components of the gas turbine 33 superposing on the molten salt region (liquid phase) on the molten salt map is reduced, calculates the combustion temperature of combustion gas for burning low-quality fuel by the combustor 32 of the gas turbine device 30.

And, so as to obtain the calculated combustion temperature of combustion gas, the calculator of the section for optimizing operational conditions 4 outputs a command signal to the fuel regulating valve 35 installed in the fuel system supplied to the combustor 32, thereby regulates the opening angle of the fuel regulating valve 35, and controls the flow rate of low-quality fuel supplied to the combustor 32 so as to be reduced. As a result, the calculator of the section for optimizing operational conditions 4 can reduce the temperature of combustion gas generated by burning low-quality fuel by the combustor 32 for heating the movable blades 22 and static blades 21 of the high-temperature components of the gas turbine 33 to a desired temperature.

FIG. 5 shows the molten salt map using $Na_2SO_4$ and $K_2SO_4$ as molten salt which is calculated by the calculator of the section for optimizing operational conditions 4 and the surface temperature and pressure distributions of the first stage static blades 21 and the first stage movable blades 22 of the high-temperature components of the gas turbine 33 heated by combustion gas burnt in the combustor 32.

By comparison of the molten salt map using $Na_2SO_4$ and $K_2SO_4$ as molten salt and the surface temperature and pressure distributions of the high-temperature components of the gas turbine which are shown respectively in FIGS. 5 and 3, the molten salt map and the surface temperature and pressure distribution of the high-temperature components of the gas turbine which are shown in FIG. 3 show that in the combustion conditions of low-quality fuel by the combustor 32 of the gas turbine device 30, a part of the surface temperature and pressure distribution of the first stage movable blades 22 superposes on the molten salt region in a liquid phase higher in temperature than the temperature T1 of the solidus.

On the other hand, the molten salt map and the surface temperature and pressure distributions of the high-temperature components of the gas turbine which are shown in FIG. 5 show that the opening angle of the fuel regulating valve 35 is regulated so as to reduce the combustion gas temperature by the combustion conditions of low-quality fuel by the combustor 32 of the gas turbine device 30, and the flow rate of the low-quality fuel to be supplied to the combustor 32 is reduced, thus both surface temperature and pressure distributions of the first stage movable blades 22 and the first stage static blades 21 are positioned in the solidus phase region lower in temperature than the temperature T1 of the solidus, and the portion superposing on the molten salt region in the liquid phase is eliminated.

As mentioned above, so that the surface temperature and pressure distributions of the high-temperature components of the turbine 33 become lower in temperature than the temperature T1 of the solidus of molten salt on the molten salt map, the combustion gas temperature of the low-quality fuel by the combustor 32 is controlled so as to reduce to the temperature T3, and as a result, the corrosion of the high-temperature components of the turbine 33 due to molten salt is reduced, and the lifetime thereof can be lengthened.

A calculation method for the optimum combustion gas temperature of the low-quality fuel to be burnt by the combustor 32 which is calculated by the calculator of the section for optimizing operational conditions 4, on the basis of the temperature T1 of the solidus on the molten salt map calculated by the thermodynamic equilibrium calculation of the section for making molten salt map 1, calculates the area rate (%) that the surface temperature and pressure region of the high-temperature components of the turbine at a certain combustion gas temperature superposes on the molten salt region and identifies the combustion gas temperature T3 for minimizing the value.

And, the calculation method, so that the combustion gas temperature becomes the combustion gas temperature T3 at which the area rate (%) of the surface temperature and pressure region of the high-temperature components of the turbine superposing on the molten salt region is minimized, regulates the opening angle of the fuel regulating valve 35 installed in the fuel system supplied to the combustor 32 of the gas turbine device 30 and controls the flow rate of the low-quality fuel supplied to the combustor 32 so as to reduce it.

The solidus temperature T1 on the molten salt map calculated by the calculator of the section for optimizing operational conditions 4 is about 800° C. to 900° C., and although depending on the gas turbine device, generally, the combustion gas temperature of 1200° C. to 1300° C. is regulated so that the flow rate of the low-quality fuel supplied to the combustor 32 is reduced, thus the temperature of the movable blades 22 and static blades 21 of the high-temperature components of the gas turbine 33 is reduced within the range from about 10° C. to 200° C., thereby the temperature and pressure of the high-temperature components can be moved from the molten salt region in the liquid phase to the solid phase region.

As a result, the temperature of combustion gas which is generated by combustion of low-quality fuel by the combustor 32 and flows down to the movable blades 22 and static blades 21 of the high-temperature components of the turbine 33 is reduced to the desired temperature T3, and the surface temperature and pressure distributions of the movable blades 22 and static blades 21 of the high-temperature components can be controlled so as to move from the liquid phase region to a solid phase region lower in temperature than the solidus corresponding to the temperature T1, and as shown in FIG. 5, a situation that the surface temperature and pressure distributions of the movable blades 22 and static blades 21 of the high-temperature components of the turbine 33 superpose on the molten salt region in a liquid phase can be avoided.

On the other hand, in the above explanation, in the case that the low-quality fuel of C heavy oil or heavy-duty oil contains the impurities of Na, K, and S, the region higher in temperature than the solidus indicated by a solid line corresponding to the temperature T1 on the molten salt map shown in FIG. 2 is assumed as a molten salt region in a liquid phase. However, when the impurities of the low-quality fuel contain V in addition to Na, K, and S, the region higher in temperature than the solidus indicated by a dashed line corresponding to the temperature T2 lower than the temperature T1 on the molten salt map shown in FIG. 2 becomes a molten salt region in a liquid phase and the molten salt region is enlarged.

Therefore, a calculation method for the optimum combustion temperature of the low-quality fuel to be burnt by the combustor 32 which is calculated by the calculator of the section for optimizing operational conditions 4, on the basis of the temperature T2 of the solidus on the molten salt map calculated by the thermodynamic equilibrium calculation of the section for making molten salt map 1, calculates the area rate (%) that the surface temperature and pressure region of the high-temperature components of the turbine at a certain combustion gas temperature superposes on the molten salt region and identifies the combustion gas temperature T3' for minimizing the value.

And, the calculation method, so that the combustion gas temperature becomes the combustion gas temperature T3' at which the area rate (%) of the surface temperature and pressure region of the high-temperature components of the turbine superposing on the molten salt region is minimized, regulates the opening angle of the fuel regulating valve 35 installed in the fuel system supplied to the combustor 32 of the gas turbine device 30 and controls the flow rate of the low-quality fuel supplied to the combustor 32 so as to reduce it even more.

As a result, the temperature of combustion gas which is generated by combustion of low-quality fuel by the combustor 32 and flows down to the movable blades 22 and static blades 21 of the high-temperature components of the turbine 33 is reduced to the desired temperature T3' lower than the temperature T3, and the surface temperature and pressure distributions of the movable blades 22 and static blades 21 of the high-temperature components are controlled so as to be lower in temperature than the solidus corresponding to the temperature T2, and as shown in FIG. 5, and the surface temperature and pressure distributions of the movable blades 22 and static blades 21 of the high-temperature components of the turbine 33 can be positioned in the solid phase region, so that a situation that the distributions superpose on the molten salt region in a liquid phase can be avoided.

As mentioned above, according to this embodiment, an operation control method for a gas turbine, to manage the lifetime of the high-temperature components used for the gas turbine, for precisely estimating the corrosion rate of high-temperature corrosion caused on the high-temperature components of the gas turbine due to impurities of Na, K, and S or impurities of Na, K, S, and V contained in low-quality fuel burnt in the gas turbine and suppressing progress of the high-temperature corrosion and an operation controller for the gas turbine can be realized.

INDUSTRIAL APPLICABILITY

The present invention can be applied to an operation control method for a gas turbine for burning low-quality fuel rich in impurities of Na, K, and S or impurities of Na, K, S, and V and an operation controller for the gas turbine.

LEGEND

1: Section for making molten salt map, 2: Section for determining corrosion region, 3: Section for predicting corrosion damage, 4: Section for optimizing operational conditions, 10: Input data device, 11: Fuel database, 12: Operation database, 13: High-temperature design database, 14: Material database, 15: Periodic inspection database, 21: First stage static blades, 22: First stage movable blades, 30: Gas turbine device, 31: Compressor, 32: Combustor, 33: Turbine, 34: Generator, 35: Fuel regulating valve, 50: Corrosion-rate estimating and calculating device, 60: Display, 100: Operation controller

The invention claimed is:

1. An operation control method for a gas turbine for burning low-quality fuel containing high-temperature corrosive impurities, comprising the steps of:
    making a molten salt map showing the dew point and solidus temperatures of a molten salt in a liquid phase state as a function of pressure, the molten salt being selected on a basis of impurities contained in the low-quality fuel and operation data of the gas turbine, by calculating a dew point and a solidus temperature of molten salt resulting from combustion of the low-quality fuel and causing high-temperature corrosion on high-temperature components of the gas turbine through which high-temperature combustion gas flows using a thermodynamic equilibrium calculation,
    calculating and indicating a surface temperature and a pressure of the high-temperature components of the gas turbine superposed on the molten salt map to determine a superposition state of the surface temperature and the pressure on a region of molten salt in a liquid phase,
    predicting a lifetime of the high-temperature components of the gas turbine by estimating a corrosion rate of the high-temperature components, and
    controlling a flow rate of the low-quality fuel supplied to a combustor on the basis of the prediction of the lifetime of the high-temperature components so that an area of surface temperature and pressure regions of the high-temperature components of the gas turbine superposed on the region of molten salt in the liquid phase on the molten salt map is reduced.

2. The operation control method for a gas turbine according to claim 1, wherein:
    the calculation for the molten salt map preparation, on the basis of the impurities contained in fuel data of the low-quality fuel and the operation data, prepares the molten salt map composed of a gas phase, a liquid phase, and a solid phase by calculating a dew point and a solidus temperature of an alkaline sulfate and a vanadium compound for causing high-temperature corrosion on the high-temperature components composing the gas turbine through which high-temperature combustion gas flows down due to the impurities using the thermodynamic equilibrium calculation.

3. The operation control method for a gas turbine according to claim 1, wherein:
    the calculation for corrosion region determination shows the surface temperature and the pressure of the high-temperature components calculated using design data of the high-temperature components of the gas turbine on the molten salt map made by the calculation for the molten salt map preparation and determines whether the surface temperature and the pressure superpose on the region of molten salt in the liquid phase or not.

4. The operation control method for a gas turbine according to claim 1, wherein:
    the calculation for corrosion damage prediction estimates the corrosion rate of the high-temperature components of the gas turbine using material data and periodic inspection data and predicts the lifetime of the high-temperature components.

5. The operation control method for a gas turbine according to claim 1, wherein:
    the calculation for operation condition optimization, on the basis of the prediction of the lifetime of the high-temperature components calculated in corrosion damage prediction, controls the flow rate of the low-quality fuel supplied to the combustor of the gas turbine device so as to reduce so that an area of surface temperature and pressure regions of movable blades and static blades, which are the high-temperature components of the gas turbine, superposing on the region of molten salt in the liquid phase on the molten salt map is reduced.

6. The operation control method for a gas turbine according to claim 4, wherein:
    the calculation for the corrosion damage prediction performs the prediction of the lifetime of the high-temperature components on the basis of a molten salt generation quantity in the combustion gas.

7. The operation control method for a gas turbine according to claim 1, wherein:
    in the calculation for the molten salt map preparation, impurity concentration in the combustion gas in a calculation of a molten salt generation quantity performed by the thermodynamic equilibrium calculation is a concentration of sodium, potassium and sulfur.

8. The operation control method for a gas turbine according to claim 1, wherein:

in the calculation for the molten salt map preparation, impurity concentration in the combustion gas in a calculation of a molten salt generation quantity performed by the thermodynamic equilibrium calculation is a concentration of sodium, potassium, sulfur, and vanadium.

9. An operation controller for a gas turbine for burning low-quality fuel containing high-temperature corrosive impurities, comprising:

a calculator for molten salt map preparation for making a molten salt map showing the dew point and solidus temperatures of a molten salt in a liquid phase state as a function of pressure, the molten salt being selected on a basis of impurities contained in the low-quality fuel and operation data, by calculating a dew point and a solidus temperature of molten salt resulting from combustion of the low-quality fuel and causing high-temperature corrosion on high-temperature components of the gas turbine through which high-temperature combustion gas flows using a thermodynamic equilibrium calculation, a calculator for corrosion region determination for calculating and indicating a surface temperature and a pressure of the high-temperature components of the gas turbine superposed on the molten salt map made by the calculator for molten salt map preparation to determine a superposition state of the surface temperature and the pressure on a region of molten salt in a liquid phase, a calculator for corrosion damage prediction for predicting a lifetime of the high-temperature components of the gas turbine by estimating a corrosion rate of the high-temperature components, and a calculator for operational condition optimization and outputting a command signal for controlling a flow rate of the low-quality fuel supplied to a combustor on the basis of the prediction of the lifetime of the high-temperature components so that an area of surface temperature and pressure regions of the high-temperature components of the gas turbine superposed on the region of molten salt in the liquid phase on the molten salt map is reduced.

10. The operation controller for a gas turbine according to claim 9, wherein:

the calculator for molten salt map preparation, on the basis of impurities contained in fuel data of the low-quality fuel installed in an input data device and operation data, prepares the molten salt map composed of a gas phase, a liquid phase, and a solid phase by calculating a dew point and a solidus temperature of an alkaline sulfate or molten salt of a vanadium compound for causing high-temperature corrosion on the high-temperature components of the turbine through which high-temperature combustion gas flows down due to the impurities using the thermodynamic equilibrium calculation.

11. The operation controller for a gas turbine according to claim 9, wherein:

the calculator for corrosion region determination shows the surface temperature and the pressure of the high-temperature components calculated using design data of the high-temperature components of the gas turbine installed in an input data device on the molten salt map made by the calculator for molten salt map preparation and determines whether the surface temperature and the pressure superpose on the region of molten salt in the liquid phase or not.

12. The operation controller for a gas turbine according to claim 9, wherein:

the calculator for corrosion damage prediction estimates the corrosion rate of the high-temperature components of the gas turbine using material data and periodic inspection data installed in an input data device and predicts the lifetime of the high-temperature components.

13. The operation controller for a gas turbine according to claim 9, wherein:

the calculator for operation condition optimization, on the basis of the prediction of the lifetime of the high-temperature components calculated by the calculator for corrosion damage prediction, controls the flow rate of the low-quality fuel supplied to the combustor of the gas turbine device so as to reduce so that an area of surface temperature and pressure regions of movable blades and static blades which are the high-temperature components of the gas turbine superposing on the region of molten salt in the liquid phase on the molten salt map is reduced.

14. The operation controller for a gas turbine according to claim 12, wherein:

the calculator for corrosion damage prediction performs the prediction for the lifetime of the high-temperature components on the basis of a molten salt generation quantity in the combustion gas.

* * * * *